United States Patent
Karr

(10) Patent No.: US 10,468,768 B2
(45) Date of Patent: Nov. 5, 2019

(54) HOLONOMICALLY CONSTRAINED (TETHERED) SPIN-AROUND LOCATOR

(71) Applicant: Lawrence J. Karr, Santa Monica, CA (US)

(72) Inventor: Lawrence J. Karr, Santa Monica, CA (US)

(*) Notice: Subject to any disclaimer, the term of this patent is extended or adjusted under 35 U.S.C. 154(b) by 666 days.

(21) Appl. No.: 14/870,644

(22) Filed: Sep. 30, 2015

(65) Prior Publication Data

US 2016/0091601 A1    Mar. 31, 2016

Related U.S. Application Data

(60) Provisional application No. 62/057,608, filed on Sep. 30, 2014.

(51) Int. Cl.
| | | |
|---|---|---|
| *H01Q 3/02* | (2006.01) | |
| *G01S 3/58* | (2006.01) | |
| *G01S 13/76* | (2006.01) | |
| *G01S 11/10* | (2006.01) | |

(52) U.S. Cl.
CPC ............. *H01Q 3/02* (2013.01); *G01S 3/58* (2013.01); *G01S 13/762* (2013.01); *G01S 11/10* (2013.01)

(58) Field of Classification Search
CPC .......... H01Q 3/02; H01Q 3/10; H01Q 3/2664; H01Q 3/32; G01S 3/58; G01S 3/72; G01S 3/74; G01S 13/505; G01S 13/5242; G01S 13/5246; G01S 13/877; G01S 13/762; G01S 11/10; G01S 3/38; G01S 3/40; G01S 3/44; G01S 3/52
See application file for complete search history.

(56) References Cited

U.S. PATENT DOCUMENTS

| | | | | |
|---|---|---|---|---|
| 3,747,105 | A * | 7/1973 | Payne | ........................ G01S 3/52 342/418 |
| 5,418,537 | A | 5/1995 | Bird | |
| 5,576,716 | A | 11/1996 | Sadler | |
| 7,791,470 | B2 | 9/2010 | Karr | |
| 2003/0117320 | A1* | 6/2003 | Kim | ......................... G01S 3/16 342/457 |
| 2007/0194923 | A1* | 8/2007 | Karr | ......................... G01S 3/52 340/572.1 |

(Continued)

*Primary Examiner* — Bernarr E Gregory
*Assistant Examiner* — Daniel P Malley, Sr.
(74) *Attorney, Agent, or Firm* — John G. Posa; Belzer PC

(57) ABSTRACT

An improved two-way tagging tracking and locating system uses time of arrival (TOA), Doppler, and angle of arrival (AOA) in conjunction with remote tags and a locator. The locator's antenna is tethered to a central point, and moved in a constrained motion so that it describes a roughly circular horizontal path. The locator transmits and receives sets of complex radio sequences to/from the tag(s) so that the tag(s) emit signals which are phase, chip, and symbol coherent with the received locator signals. This enables the locator to determine the distances and Doppler shifts between itself and the tag(s) at various positions in its path such that, by post correlation processing of complex captured signal sequences, aims a virtual phased array antenna at the tag(s), resulting in enhanced distance and direction measurements. The angular position of the orbiting locator's antenna may be measured using an electronic compass packaged with the antenna.

20 Claims, 5 Drawing Sheets

(56) References Cited

U.S. PATENT DOCUMENTS

2008/0042921 A1* 2/2008 Gierow ................. H01Q 1/082
　　　　　　　　　　　　　　　　　　　　　　343/882
2008/0165059 A1* 7/2008 Karr ..................... G01S 13/765
　　　　　　　　　　　　　　　　　　　　　　342/378

* cited by examiner

HOLONOMICALLY CONSTRAINED (TETHERED) SPIN-AROUND LOCATOR

REFERENCE TO RELATED APPLICATION

This application claims priority from U.S. Provisional Patent Application Ser. No. 62/057,608, filed Sep. 30, 2014, the entire content of which is incorporated herein by reference.

FIELD OF THE INVENTION

This invention relates generally to object locators and, in particular, to a locator with a spinning antenna that simulates a virtual phased array antenna aimed at the tag(s), resulting in enhanced distance and direction measurements.

BACKGROUND OF THE INVENTION

Apparatus and methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle.

Other known location determination techniques include the use of a Loran or a Glonass satellite based system. Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

In the context of object locators, low-power transmissions are subject to signal corruption due to noise, static, and signal interference. Extracting information from a signal in the presence of such interference and noise is very difficult when the information signal is of the same order of magnitude as the noise sources. My issued U.S. Pat. No. 7,791,470, the entire content of which is incorporated herein by reference, addresses issues with noise by taking advantage of acquired frequency knowledge. This allows for synthesis of a time and phase coherent response to accurately determine location with a low-power transponder. A hand-held remote locator (RL) device is used to locate a transponder or micro-transponder (MT). The user activates the RL to transmit a multi-frame ping to the MT in a slow ping mode, where the MT transmits reply messages when the multi-frame ping is received The RL calculates a distance between the RL and the MT using the time-of-flight (TOF) between the transmission of a ping and the receipt of a reply. The user can then engage a fast ping mode, where the RL transmits the multi-frame ping at an increased rate. The user then extends the RL device away from their body and turns through at least a partial arc length about their center line such that data is collected including compass readings, Doppler information, and distance calculations. The directional location for the MT is determined by the RL using the collected data.

SUMMARY OF THE INVENTION

The presently described invention extends and improves upon the teachings of the '470 patent referenced above. The system and method identifies various noise problems, and provides a new and novel system, method, and apparatus that is arranged to extract signals from a transmission using very low power in a small scale object location system with enhanced distance and location accuracy.

The preferred embodiment provides a two-way tagging tracking and locating system using time of arrival (TOA), Doppler, and angle of arrival (AOA) in conjunction with remote tags and a locator. The locator's antenna is tethered to a central point, and moved in a constrained motion around an upraised hand or other support, so that it describes a roughly circular horizontal path.

In the preferred embodiment, the locator is transmitting and receiving sets of complex radio sequences to/from the tag(s) so that the tag(s) emit signals which are phase, chip, and symbol synchronous with the locator signals. This enables the locator to determine the distances and Doppler shifts between itself and the tag(s) at various positions in its path such that, post correlation processing of complex captured signal sequences aims a virtual phased array antenna at the tag(s), resulting in enhanced distance and direction measurements.

The angular position of the orbiting locator's antenna may be measured using an electronic compass packaged with the antenna, making the relative positions of the locator's antenna known to the locating system. The locator's antenna may be attitude stabilized in its nominally circular path by affixing the tether to a dense portion of the locator's antenna, and affixing a lightweight aerodynamic drag structure to a trailing portion of the locator's antenna, since the tether tension will have a constant ratio to the aerodynamic drag force regardless of velocity.

The locator's antenna may be held in a nominally vertical orientation, with the locator being co-located with the antenna. The locator may be connected to a personal electronic device such as a smart phone through an additional wireless link, wired or optical fiber connection. The personal electronic device is used to display tag(s) positions on a display screen. The tag(s) position may be displayed are relative to the user's position. The tags(s) positions may also be referenced to GPS and/or shown on maps.

DETAILED DESCRIPTION OF THE INVENTION

Figure 1:
FIG. 1 shows a person using a tethered, spin-around locator according to the invention.

I have discovered that a locator which uses two-way measurements of TOA (time of arrival) and Doppler shift may be connected wirelessly to a smartphone and spun around on the end of a tether. A reasonable communication scheme for connecting the locator to a smartphone, for example, would be Bluetooth low energy. See my issued U.S. Pat. Nos. 7,791,470, 7,573,381, 7,592,918, 7,646,330, 7,864,045, 7,917,155, 7,936,271, 8,258,923, RE43740, 8487756, RE44526, 8583145, and RE45061, the entire content of each being incorporated herein by reference.

In addition to the two-way distance and Doppler measurements which enable direction and distance readings per my '470 patent, I have since found that the locator can further process the captured and stored correlation results obtained in positions as it rotates on a tether. This further processing creates a virtual circular phased array antenna which may be "aimed" or oriented after all of the signals have been transmitted and received. This facilitates improved direction and distance discrimination, as the correlation results may be processed as if many antennas were used, rather than a single moving antenna, so long as the signals between the tag and the locator are fully coherent and have a repeating pattern and a relatively constant frequency.

An additional innovation is that the tethered locator may orbit on a tether stably due to the tension in the tether to its center of mass and the center of aerodynamic drag force, which trails the center of mass of the locator. This aids in keeping a vertically polarized horizontally omnidirectional antenna (say, a ½ wave vertical dipole) in a consistent vertical position. This drag force may be produced by a structure akin to a badminton birdie, for instance.

Using the invention, it is "as if" the tag signal were received at the same instant by many antennas on the circular path of the single tethered locator. Under such conditions, a virtual phased array antenna may be constructed. This virtual phased array antenna, even better, can be steered after the event, so that many directions can be evaluated. Furthermore, the virtual (serial) phased array antenna does not exhibit issues with antenna elements interacting with each other, since there is only one antenna and many time shared positions. If tag(s) are outside of the plane of rotation, then the radio waves arriving at the locator's various positions will arrive with reduced time-of-flight differences, since the path lengths from the tag to the locator antenna positions will be the square-roots of the sums of the in plane and out of plane distances squared. The reduced differences can be detected from the angular positions and tether length with respect to the time-of flight differences. If the total time of flight difference in the two-way case is less than four times the tether length, then the user will know that tag(s) are off the plane of rotation. This could be useful for determining which floor of a tall building a tag is on. This principle extends to altering the locators plane of rotation so that more accurate estimates may be made of tag(s) relative elevation, for example.

The system and process perform optimally if the received signals are (nearly) identical at the source, and with adequate frequency/phase stability over the capture interval. If the capture interval is the order of 0.025 second and the relative Allan deviation of the tag and locator clocks over that interval is, say $10^{-9}$, then there will be no noticeable phase roll over that time. If the frequency shift is $10^{-9}$ and it occurs in the worst possible fashion (instantly after an observation), then the phase error from Allan deviation will be $0.915*10^9*10^{-9}*0.025$, which is $0.915*0.025$ of a turn. This phase error, which is extremely unlikely, is 0.0228 turn. As a practical matter, we find that the devices are stable enough to resolve distance changes of 2 millimeters using phase measurement, even with an observation interval of only a millisecond.

If, on the other hand, we were to use repeated measurements from the same tag transmission sequence, the small frequency error would, over the course of a ½ second rotation, cause unacceptable phase measurement errors.

Thus, the preferred signaling sequence is to have the tethered locator emit queries in a rapid fire fashion as it orbits on the tether, and receive responses shortly thereafter, in a matter of a few milliseconds. The limitation here is to capture the signal at either end long enough to evaluate the Doppler shift. Receive and transmit intervals of 5 milliseconds are adequate for this purpose.

As described in my '470 patent, a compass is included in the locator to determine its angular orientation, which also means that the locator's position about a center of rotation is given by the compass reading. The preferred embodiment maintains a vertical antenna orientation by the use of an aerodynamic drag device similar to a badminton shuttlecock, so that the tension in the tether combined with the aerodynamic drag produce a stable orientation, allowing consistent use of a vertically polarized wire antenna and of the compass, which require good vertical orientation. Other forms of aerodynamic stabilization can, of course, be used.

As the tethered locator rotates horizontally above the users head, it cyclically approaches and departs from the tagged object. In general, we are considering coherent two-way location systems as described in my U.S. Pat. No. 7,646,330. The tethered motion is very nearly circular.

In most cases, with round-trip (two-way TOA and Doppler) signaling, the overall distance change is twice the diameter of the circle, or about four times the length of the tether. All of this assumes that the G force on the locator is sufficient that the tether rotates in a very flat cone, or nearly in a plane. With some aerodynamic trickery, the tethered locator could rotate in a plane. In addition, the Doppler shift changes by four times the tangential velocity of the tethered locator.

A reasonable tether length might be ½ meter, although other lengths can be used. A locator attached to a ½ meter length tether might swing around at 2 turns per second, or an angular velocity of 4*pi radians/second. The tension in the tether for objects weighing grams or tens of grams is reasonable.

In this example, peak-to-peak Doppler variation received by a distant tag will be the twice the angular velocity times the radius divided by the speed of light, or (4*pi meters/second)/C. Since C is $3*10^8$ meters/second, the tag's received cyclic Doppler shift will be $4*pi/(3*10^8)$ or 42 parts per billion. The tag will exactly mimic this received Doppler, and re-emit signals at the received Doppler frequency. The locator will then receive, as it circles above the user, this doubled Doppler shift. Thus, the peak-to-peak Doppler received by the locator will be about 84 parts per billion. At 915 MHz, this would be a frequency change of about 77 Hz. At common received signal to noise ratios, it is reasonable to detect and measure angle differences of two degrees between packets. If the transmitting and receiving intervals are each about 5 milliseconds, then a 77 Hz frequency shows as a 138 degree carrier phase change, which should be easy to accurately measure. Thus, the Doppler readings should provide accurate velocity data. For the time periods considered, the oscillators used in tags and locators should have sufficient frequency stability. The short term Allan deviation involved will be about $10^{-9}$, allowing reasonable Doppler measurement.

An additional set of features can be implemented with an expansion of the signal processing capability of the locator. If we first consider the idea of a locator with, say, 16 antenna elements arrayed around a 1 meter diameter circle, and we switch antennas with a selector switch, so that the location process is carried out for each antenna of the locator, we could in theory think of the results as coming from a 16 element circular phased array antenna. Ignoring for the moment any Doppler effects, we could "sweep" the antenna by examining the recorded complex correlator outputs and phase rotating those to be consistent with receiving from any given direction.

If one uses a complex circular correlator as a detector of a received sequence, then the relative phase of the received sequence will be directly transformed to the phase of the correlator output. If we have a complex sequence modulating a carrier, and we heterodyne this signal by a local carrier replica, then the relative carrier phase is seen in the heterodyned low pass filtered output. If we then correlate the complex low pass filtered output with a reference signal, the correlator output still shows the phase of the original signal. In this way, we can determine the relative phase of a received carrier-modulated signal. If these correlation results are obtained for a set of sequential antenna positions as the antenna rotates on the tether, then we have a representation of the carrier phases at the various locator antenna positions.

We can process these correlation results analogously to processing the real time inputs of a physical circular phased array. In processing our virtual array, we rotate the complex correlator results to steer the beam. With a physical phased array, we employ RF phase shifters to accomplish much the same thing. Our method allows after-the-fact beam steering of the virtual phased array. The directivity of such an antenna is determined by the radius of the tether, which in turn determines how many antenna "locations" we can employ. This post-capture steering is easy once we have captured the complex correlator outputs from each antenna position. It should be noted that these "virtual" antennas unlike physical antennas, do not interact with each other. The set of positions about the circle allows for, in addition to steering, a small measure of signal focusing with respect to the distance of the virtual array from the tag. The post correlation processing might be done in hardware, but, since there is usually adequate time to process the captured signals, it is convenient and preferred to do this in software. The processing is particularly simple in the case where tag(s) are sufficiently distant and in the plane of rotation. In this case, the antenna positions relative to the central tether may be thought of as intercepting a plane wave. The time differences between captures at various antenna positions are expressed simply as the product of the effective tether length and the cosine of the included angle(s) with respect to the intended aiming direction. Thus, if the tether is 1.5 wavelengths long, and a particular capture has the antenna directly towards the aiming point, then that capture would be 1.5 wavelengths early with respect to the tethers pivot point. If another capture occurred with, say 27 degrees between its position and the aiming point, then its capture would be 1.5 wavelengths times the cosine of (27 degrees) early or 1.5*0.891 early. This is 1.3365 wavelengths early. Thus, in the aiming process, we phase retard the first correlation result by 1.5 wavelengths, which is, of course equal to 0.5 wavelength or 180 degrees, and we retard the second correlation result by 0.3365 wavelengths, which is 121 degrees. If another capture occurred at, say 143 degrees away from the aiming point, its signal would need to be phase retarded by cos(143 degrees)*1.5 wavelengths, or −1.198 wavelengths, which is equal to advancing its phase by 0.198 wavelength or 71.3 degrees. The various correlation functions and compass readings are phase adjusted in this fashion, and summed, resulting in a post-correlation virtual phased array antenna output. It should be noted that, in the case where the individual signals are round trips, then the effective tether length is doubled in the calculation. The phase adjustments can be implemented in many different ways involving sine and cosine products (angle sum and difference calculations), or by cordic rotators, for instance.

When the rotated correlation functions are summed, it may be found that an attenuated direct path signal "pops up out of the noise" compared to a strong reflected signal. At the correct pointing angle, the summed direct path signal will be strengthened. Note that this type of virtual phased array antenna has no interaction between the virtual "elements" as do closely spaced physical array antennas. The computation required to perform this antenna steering for, say, 24 directions (every 15 degrees) and a set of 16 captures, assuming that each correlation result is expressed as 16 complex numbers is 4*16*24*16 real multiplies plus some sine and cosine lookup and some summing, or about 25,000 simple multiplies. This would explore 24 possible directions. A modest (100 MHz) processor would complete this in less than 1 millisecond. The summed correlation terms should exhibit reduced multipath contamination and allow much more precise position fixing.

When the phased array antenna is "pointing" toward the tag, the line-of-sight signal would be strongest, as the individual complex correlations would constructively combine.

The advantages of the embodiments described herein versus my issued patent(s) on a spin-around locator include at least the following:

1. The Doppler shift is increased, because a person generally cannot safely spin around as fast as a tethered object. This yields improved angular accuracy.

2. It is much easier to maintain a circular path, since the user moves only slightly rather than taking steps. This again improves accuracy.

3. As the locator is above the users head, the user's body won't shadow the signal as would be the case when the path from the locator to the tag passes through the user's body.

4. The tether may be affixed to a swivel, since the tether isn't used for purposes other than as a tension member. This avoids the issue of winding up electrical cables and/or rotary signal connections. The wireless connection here is very useful.

5. The operator of the locator is arguably less conspicuous than he/she would be performing a pirouette.

6. The device may be concealed in various ways, as an umbrella, a necklace, or other items that may be inconspicuously spun in a circle.

7. The locator used with a smart phone or PED can be very small and light, with computation, mapping, and data display ably handled by the phone.

8. The smartphone's GPS capability allows absolute positioning.

9. The aerodynamic drag device acts as a speed regulator, since the drag force increases as the square of the velocity. This produces more consistent results. Note here that the tension on the tether also increases as the velocity squared. This results in a constant force ratio between the tether tension and the aerodynamic drag. Consequently, the body of the locator will remain in a constant orientation unless a significant wind is present. The planned velocity of 2*pi meters/second is about 22.6 kilometers/hour, or 13 miles/hour. It may be desirable in windy areas to fly the locator faster, minimizing crosswind effects.

10. The locator may automatically switch on when it is spun, using an accelerometer or sensing compass rate. Since the locator will pull on the tether with several times the locator's weight, then an accelerometer or a tension gauge can indicate that the user is spinning the device.

11. The user can refer to the cellphone for tag location information after the spin around procedure.

Antenna Array Synthesis in the Tethered Locator

In the tethered location system, it is possible to extract useful phase information which can be combined to make the equivalent of a multi-element phased array antenna. To achieve this state, it is necessary to have very good phase control, which isn't trivial, especially at GHz frequencies. The TCXOs readily available for tags and locators in this context have Allan deviations between $10^{-10}$ and $10^{-9}$. That level of performance is marginal for phase coherence over a tether spin time of ½ second.

There are at least two approaches available to ameliorate this difficulty.

In a first method, one can use periodic calibrations of the tags oscillator to the locator's frequency to reduce the phase uncertainty. For each turn of the locator, a zero Doppler condition exists twice per turn when the locator's positions are in a line to the apparent signal source direction with the tether anchor. These zero Doppler conditions are at angles separated by 180 degrees, and frequency calibration can be done at those angular positions. This method may be satisfactory in some cases.

A GPS frequency reference calibration may be carried out as needed.

In another method, all transactions with the tag will be a round trip, in which case only the oscillator drift over the very short transmit-receive time gap of perhaps 10 milliseconds contributes to phase error.

This method causes the effective signal path length change to be twice the circle diameter, since the locator to tag signal and the tag to locator signals travel the distance. Thus, for a ½ meter length tether, the total round-trip path length change would be 2 meters, or twice the diameter of the circular path traveled by the locator.

At a frequency of 915 MHz, for example, 2 meters is approximately six wavelengths. This is useful for distance determination, but may cause phase ambiguity. To deal with potential phase ambiguity, it is desired to have round-trip communication exchanges at many points in the circle. If communication occurs at 90 degree rotation intervals (4 times per rotation), then the delta distance between round trip exchanges will be in the range between 1 meter and 1.4 meters. For each doubling of the number of round-trip exchanges, the delta distance will roughly halve, so reducing the possibility of ambiguity. Signal exchanges 8 times per rotation with a ½ meter tether at 915 MHz will prevent phase ambiguity.

With knowledge of the compass readings from the compass sensor at the locator antenna, it becomes possible to process the complex valued correlator output sequences, producing phase rotated sums which correspond to the outputs of a conventional circular phased array.

In these cases, we would use the averaged phase for a capture, or the phase estimate resulting from a single packet time. The present system used has a packet time of 157 microseconds, which will result in a maximum round trip phase rotation across that time interval corresponding to the carrier frequency times the maximum velocity times 157 microseconds. The maximum one-way velocity is about 3 meters/second, which is $10^{-8}$ c, and the carrier frequency is 915 MHz, so the product is $1.57*10^{-12}$ times $9*10^{8}$ or $1.5*10^{-3}$ time one turn. This is a maximum phase twist of about 0.5 degree, which shouldn't be a problem.

Given the recovered complex correlator values and the compass readings, it is fairly simple to phase rotate and sum the stored complex correlator outputs, aiming the virtual phased array arbitrarily.

The phased array so created can dramatically reduce the effects of multipath by using its processing gain to aim at attenuated direct path signals, for instance. With this approach, reflected signals will be attenuated relative to the direct signal, as the array will, in general, attenuate signals arriving away from its main lobe. The angular resolution achievable by a phased array is the proportional to lambda over the array diameter. In our examples, we might expect about a 0.3 radian resolution from a 1 meter diameter virtual array and a ⅓ meter wavelength. Longer tethers enlarge the virtual phased array.

Figure 1A:
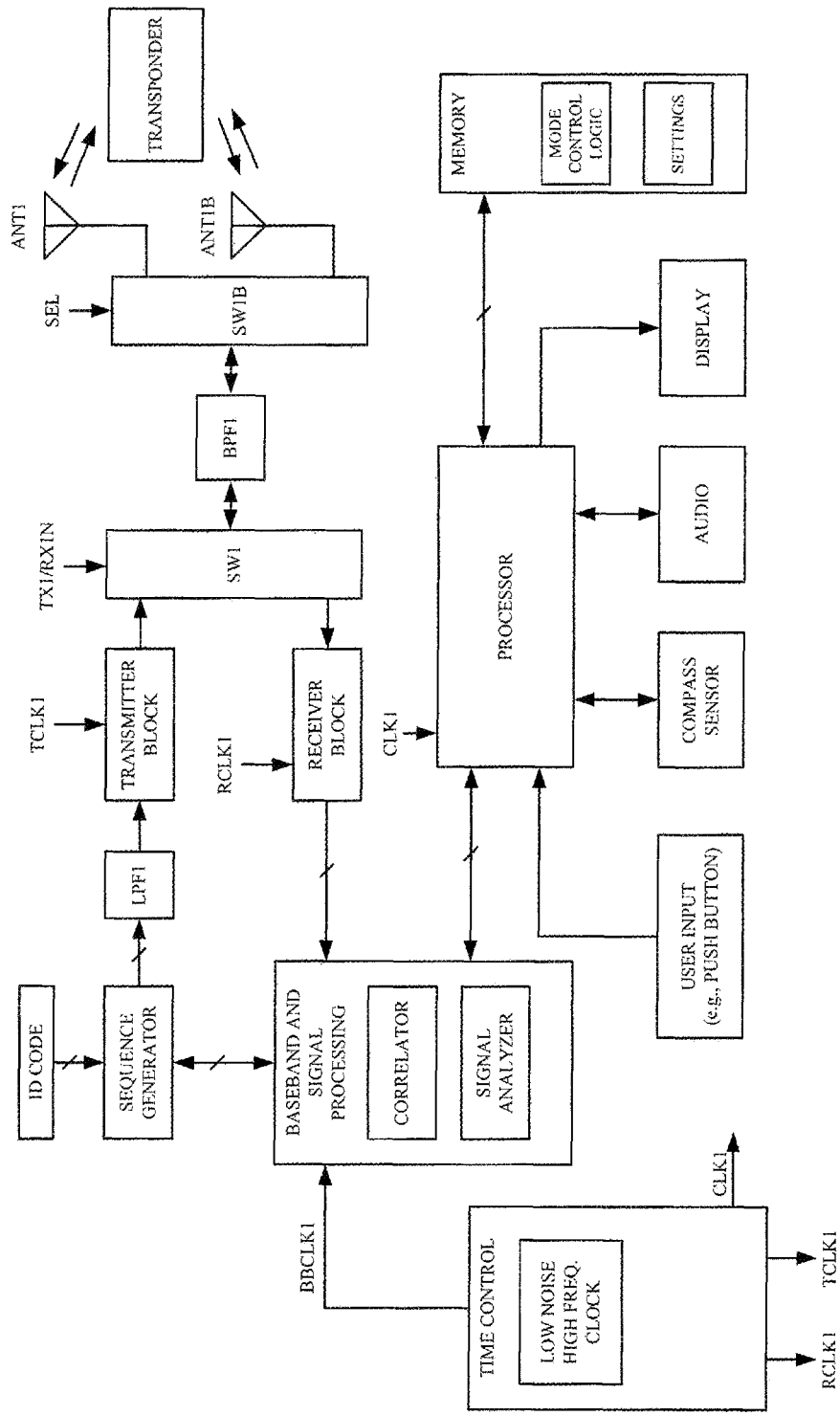
FIG. 1A is a block diagram applicable to the invention taken from U.S. Pat. No. 7,791,470, incorporated herein by reference.
Figure 2:
FIG. 2 shows a person wearing a tag.
Figure 3:
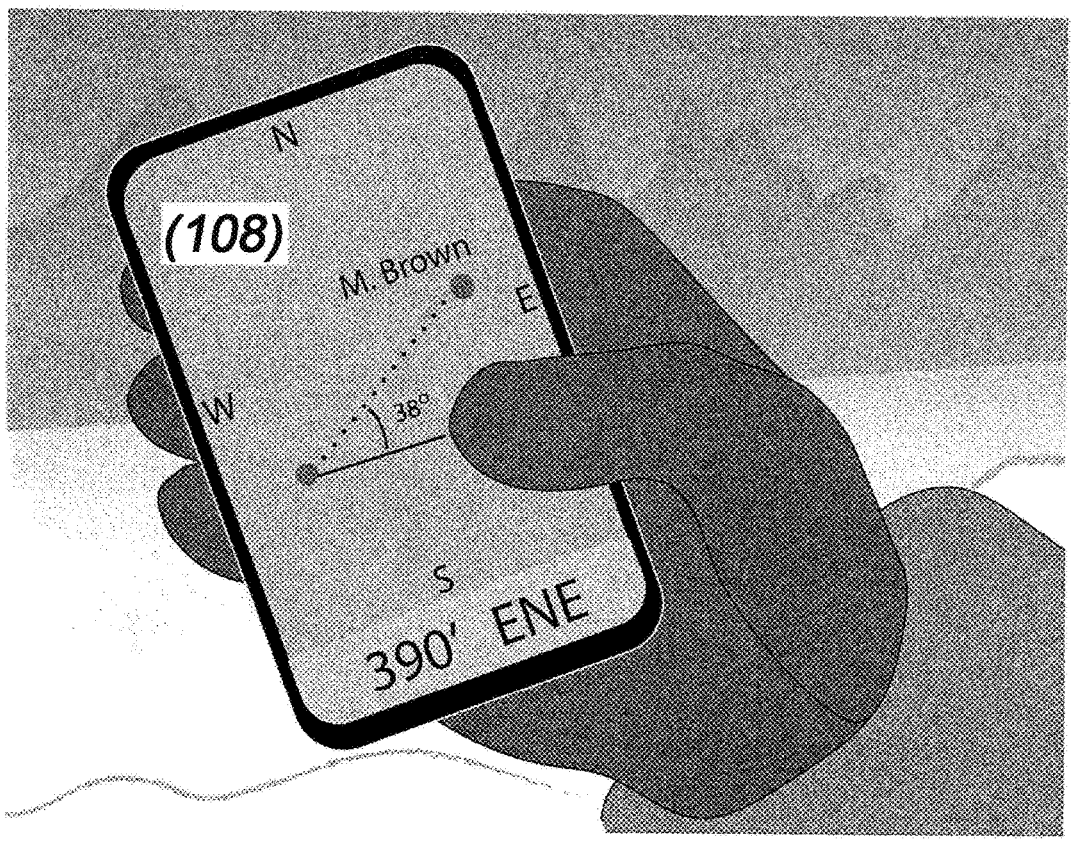
FIG. 3 shows a screen display on a hand-held electronic device showing the distance and orientation from the locator to the tag.
Figure 4:
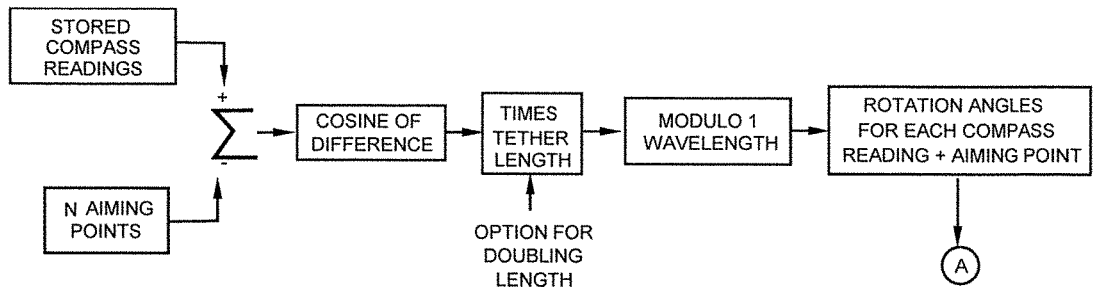
FIG. 4 shows an example of post-correlation beam steering using the stored complex correlation results, the compass reading corresponding to each correlation result, and the tether length.
Figure 4:
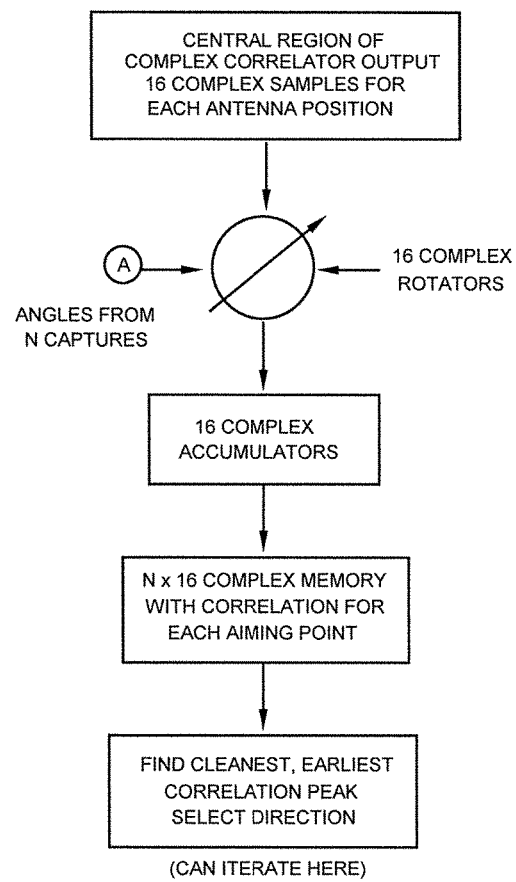

FIG. 1 shows a person using a tethered, spin-around locator 102 according to the invention. The spinning antenna is shown at 104 and at other positions in its path, each position showing aerodynamic or mechanical apparatus 106 to maintain the antenna in a relatively constant orientation. A smartphone is illustrated at 108. FIG. 1A is a block diagram applicable to the invention taken from U.S. Pat. No. 7,791,470, incorporated herein by reference. This block diagram shows an RF transmitter, RF receiver, RF transponder, antenn(a)s, and processor. FIG. 2 shows a person wearing a tag 202 that contains the transponder. FIG. 3 shows a screen display on a hand-held electronic device (i.e., smartphone) showing the distance and orientation from the locator to the tag, including angle-reporting.

The invention claimed is:

1. An enhanced distance and direction locator system, comprising:
   an electronic tag including an RF transponder operative to coherently send and receive complex signal sequences in response to interrogations from an electronic locator unit;
   an electronic locator unit including an antenna and an RF transmitter and receiver operative to send and receive complex signal sequences to and from the tag through the antenna;
   a tether having a length;
   wherein the locator antenna spins on the tether in response to an applied force so as to approximate a continuous, circular path having a nominal radius;
   a processor at the locator unit operative to perform the following correlation and post-correlation beam-steering functions:
   receive successive complex signal sequences from the tag;
   calculate complex circular correlation functions of the successively received complex signal sequences with respect to a reference signal to generate a set of correlation results as the antenna rotates,
   determine time delays and phase rotations associated with the successively received complex signal sequences based upon the set of correlation results,
   use the rotating antenna as a virtual circular phased array antenna by performing time alignment and summation of the correlation results that are geometrically consistent with a set of target azimuth values, define a peak trial azimuth position as the greatest coherent summed correlation result;

identify a peak trial azimuth position as tag direction, and determining tag distance as the round-trip time delay divided by twice the speed of light plus the tether length.

2. The enhanced distance and direction locator system of claim 1, wherein circular motion of the antenna produces a cyclic Doppler shift used to determine tag direction and tag radial velocity.

3. The enhanced distance and direction locator system of claim 1, wherein:

the complex signal sequences are code-division, multiple access (CDMA) sequences with phase, chip and symbol characteristics: and wherein the tag, after a predetermined time delay, emit signals that are phase, chip, and symbol coherent with the locator radio sequences.

4. The enhanced distance and direction locator system of claim 1, wherein:

the locator, the tag, or both the locator and tag are moving; and the processor is operative to update the distance and direction measurements as a function of the relative movement.

5. The enhanced distance and direction locator system of claim 1, wherein the locator includes a display to show the distance and direction measurements to a user.

6. The enhanced distance and direction locator system of claim 1, wherein the locator includes a display that shows tag position.

7. The enhanced distance and direction locator system of claim 1, wherein:

the locator forms part of a hand-held electronic device; and a user manipulates the hand-held electronic device to spin the antenna.

8. The enhanced distance and direction locator system of claim 7, wherein the hand-held electronic device includes a display that shows the distance and direction measurements or tag position to a user.

9. The enhanced distance and direction locator system of claim 7, wherein the hand-held electronic device is or forms part of a smartphone.

10. The enhanced distance and direction locator system of claim 1, wherein the post correlation processing is used to minimize the effects of multipath, using the virtual synthetic phased array to selectively enhance the direct path signals by means of synthesized antenna directionality.

11. The enhanced distance and direction locator system of claim 1, wherein the complex signal sequences exchanged between the locator and tags are all two-way, round trip sequences.

12. The enhanced distance and direction locator system of claim 11, wherein the tag emits a series of signals as the locator is spun based on initial two-way exchanges.

13. The enhanced distance and direction locator system of claim 11, wherein the processor is operative to apply frequency correction at the zero relative velocity points once or twice per rotation.

14. The enhanced distance and direction locator system of claim 1, further including aerodynamic or mechanical apparatus to maintain the antenna in a relatively constant orientation, such that the polarization axis of the antenna is substantially constant.

15. The enhanced distance and direction locator system of claim 1, further including a compass or other angle-reporting device to determine the angular orientation and tethered position of the locator antenna.

16. The enhanced distance and direction locator system of claim 15, wherein the compass or other angle reporting device is used to electronically control the polarization of the locator antenna to operate with a substantially constant polarization axis despite twisting of the antenna tether.

17. The enhanced distance and direction locator system of claim 1, wherein the locator antenna is rotated at a controlled air speed using aerodynamic drag.

18. The enhanced distance and direction locator system of claim 1, further including an accelerometer, tension gauge or compass sensing unit that automatically activates the locator unit upon detection of antenna spinning.

19. The enhanced distance and direction locator of claim 1, where the post correlation beam steering functions take into account the reduced inter-capture time/phase differences which occur with tags outside the nominal plane of rotation.

20. The enhanced distance and direction locator of claim 1, where the post correlation beam steering functions take into account the altered inter-capture time/phase differences which occur when the tag(s) are relatively close, so that the virtual phased array is exposed to a diverging wave rather than an effectively plane wave.

* * * * *